United States Patent [19]

Bucko, Sr.

[11] 4,078,579
[45] Mar. 14, 1978

[54] MULTIPLE PORT FLUID CONTROL DEVICE

[75] Inventor: Edward P. Bucko, Sr., Helena, Mont.

[73] Assignee: Frank E. Goodwin, Billings, Mont.

[21] Appl. No.: 717,889

[22] Filed: Aug. 26, 1976

[51] Int. Cl.² .............................................. F16K 21/00
[52] U.S. Cl. ......................... 137/625.48; 251/DIG. 1;
251/175
[58] Field of Search ...................... 137/625.48, 625.25;
251/175, DIG. 1; 92/240

[56] References Cited

U.S. PATENT DOCUMENTS

| 2,485,504 | 10/1949 | Morgan | 251/DIG. 1 |
|---|---|---|---|
| 2,684,829 | 7/1954 | McFarland, Jr. | 251/331 |
| 2,782,801 | 2/1957 | Ludwig | 137/625.48 |
| 2,855,944 | 10/1958 | Albin | 137/625.48 X |
| 2,923,523 | 2/1960 | Taylor | 251/175 |
| 2,986,165 | 5/1961 | Hogan | 137/625.25 |
| 3,017,901 | 1/1962 | Hicks, Jr. | 251/DIG. 1 |
| 3,112,768 | 12/1963 | Thompson | 137/625.5 |
| 3,123,100 | 3/1964 | Burnett | 137/625.17 |
| 3,168,109 | 2/1965 | Klingler | 137/597 |
| 3,776,277 | 12/1973 | Nagashima | 137/625.6 |
| 3,868,969 | 3/1975 | Schwenk | 137/625.5 |
| 3,951,166 | 4/1976 | Whitener | 137/625.27 |
| 3,985,337 | 10/1976 | Gripe et al. | 251/324 |
| 3,996,965 | 12/1976 | Peters | 251/DIG. 1 |

FOREIGN PATENT DOCUMENTS 638,782  3/1962  United Kingdom ................ 251/175

Primary Examiner—Arnold Rosenthal
Attorney, Agent, or Firm—Frederick E. Lange

[57] ABSTRACT

A three-way valve in which the valve disc is in the form of a flexible disc having a diameter slightly in excess of the interior diameter of the valve port so that as the valve is moved between its two valving positions, the valve disc is "flipped" over center so that its outer edge is always deflected towards the incoming fluid. In this way, the pressure drop through the valve tends to hold the edge of the disc firmly against the interior wall of the chamber. The valve disc is held between two collars retained on the valve stem which serve to maintain the central portion of the valve disc rigid. The valve stem may be actuated by a solenoid or any other suitable means.

8 Claims, 3 Drawing Figures

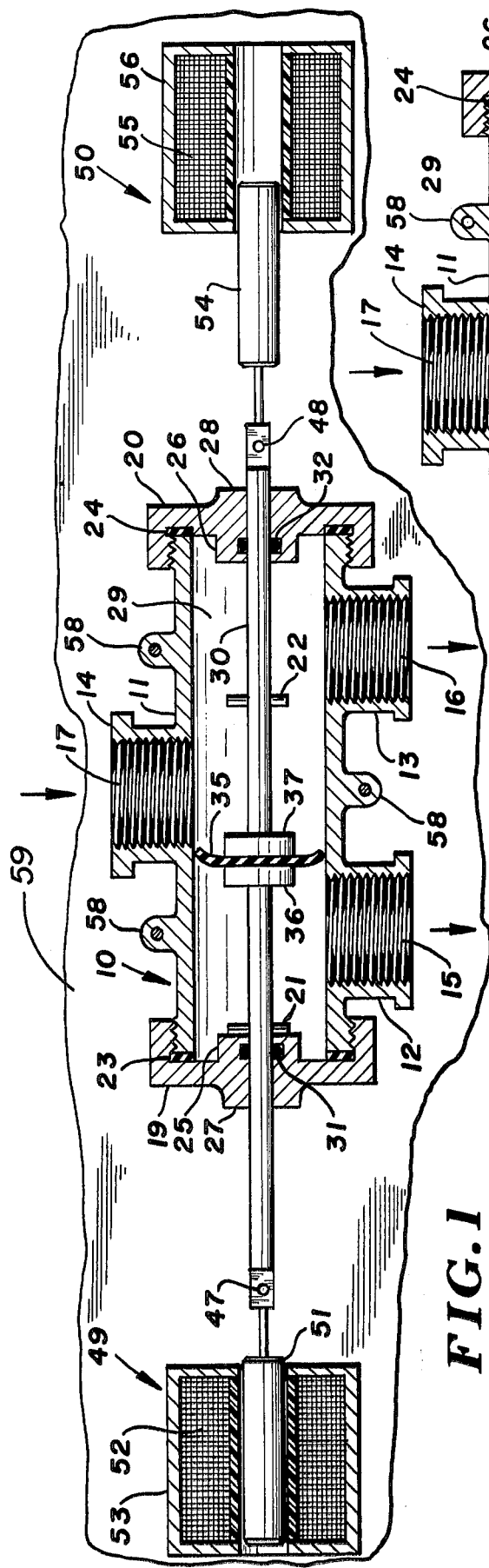
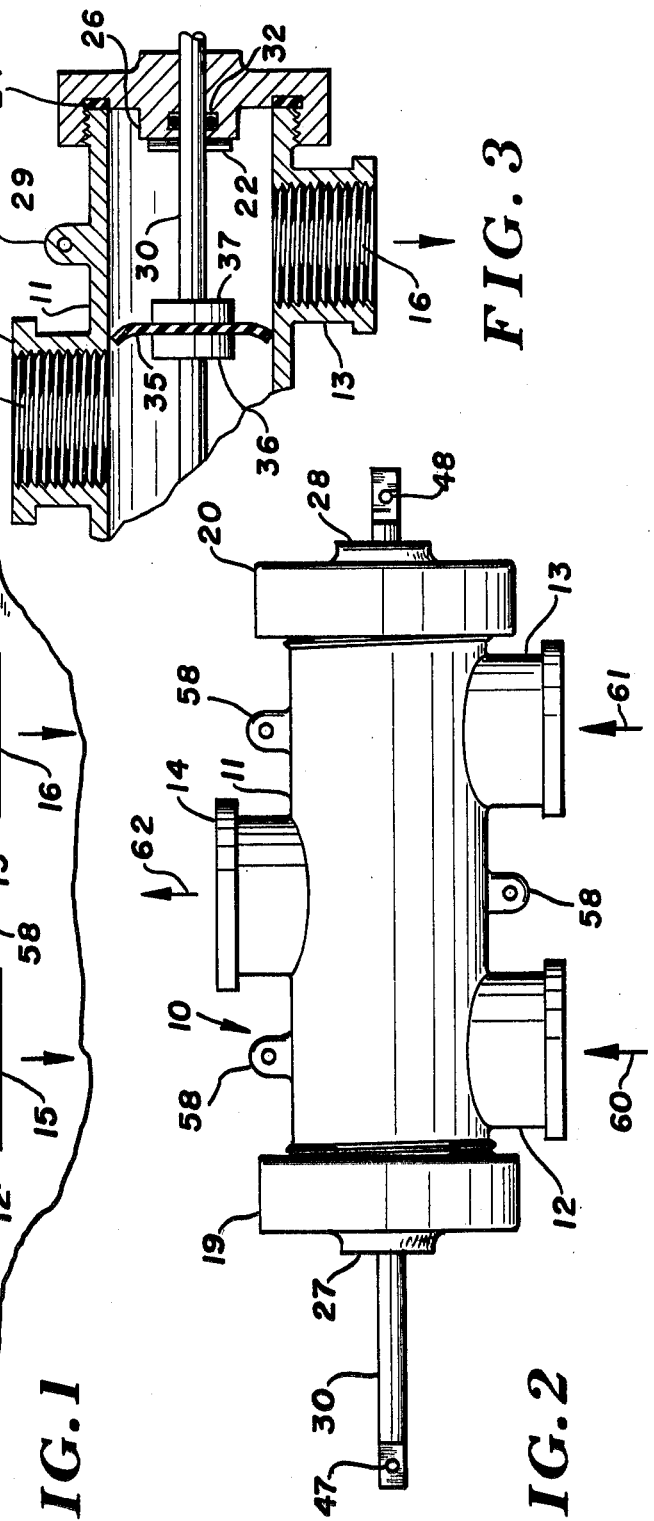
FIG. 1
FIG. 2
FIG. 3

MULTIPLE PORT FLUID CONTROL DEVICE

BACKGROUND OF THE INVENTION

It is very old to provide multiple port fluid control devices for selectively connecting together different combinations of a plurality of ports. One common form is a three-way valve which has one inlet port and two outlet ports. The inlet port is selectively connected to one or the other of the two outlet ports depending upon the position of the valve mechanism.

Many of such prior art devices are, however, relatively complicated. In some cases, they employ valve seats which must be very carefully machined. In many cases, interlocking parts are employed, all of which must be fitted together very carefully.

SUMMARY OF THE PRESENT INVENTION

The present invention is concerned with a multiple port fluid control device in which there is a flexible valve disc secured to the valve stem and in which the valve disc is slightly larger than the cross-sectional area of the valving chamber so that the outer portion of the valve disc is flexed away from a plane transverse to the valve stem as it is slid along the interior of the chamber in such a manner that the outer edge is deflected toward the incoming fluid. This valve disc is moved between a first position in which it blocks the fluid flow between two of three passages and a second position in which it blocks fluid flow between one of said first two passages and a third passage. Normally, there is one inlet passage and two outlet passages and the valve disc is moved between a position in which the fluid flow between the first inlet passage and one outlet passage is blocked and a second position in which the fluid flow between the inlet passage and a second of the outlet passages is blocked.

The diameter of the valve disc is carefully selected with respect to the internal diameter of the cylinder so that the valve disc will be slightly concave in each of its valving positions. At the same time, the valve disc is sufficiently small in diameter that it will reverse in position and will not remain in one concave position.

Stop means are provided to limit the movement of the valve stem between positions in which the desired valving action is obtained.

The valve disc is preferably held between two rigid collars which limit the portion of the disc which is flexible so that only the outer portion of the disc is flexible and is adapted to flip back and forth. These collars preferably have a diameter approximately three-quarters of the diameter of the over-all disc.

Any suitable means for actuating the valve stem may be provided such as one or more solenoid actuators.

Various other objects and features of the invention will be apparent from a consideration of the accompanying specification, claims and drawing.

BRIEF DESCRIPTION OF THE DRAWING

FIG. 1 is a sectional view of the improved fluid control device with a pair of solenoids connected to opposite ends of the valve stem for selective actuation of the valve stem in opposite directions;

FIG. 2 is an elevational view of the fluid control device; and

FIG. 3 is a fragmentary sectional view of the control device showing the valve in a different valving position than in FIG. 1.

DESCRIPTION OF THE PREFERRED EMBODIMENT

Referring to FIG. 1, a valve body 10 consists of a cylindrical housing or barrel 11 having first and second spaced ports 12 and 13 and an intermediate third port 14. Ports 12, 13 and 14 are each formed to provide a cylindrical passage therethrough, the passages through ports 12, 13 and 14 being designated by the reference numerals 15, 16 and 17, respectively. Each of these cylindrical passageways may be threaded to receive a suitable conduit. The manner in which the conduits are secured in passages 15, 16 and 17 may vary depending upon the type of conduit and the details of these connections are not critical to the present invention. Secured at the end of the barrel 11 are a plurality of closure members 19 and 20 which are in the form of end caps threadedly secured to the barrel 11. Gaskets 23 and 24 are preferably interposed between the interior walls of the end caps 19 and 20 and the end of the barrel 11 so as to form a liquid tight connection therewith. End caps 19 and 20 are provided with internal bosses 25 and 26 along with externally extending bosses 27 and 28 to provide elongated guiding surfaces for a valve stem 30. O-rings 31 and 32 are secured within the bosses 25 and 26 and serve to form a sealing engagement with the valve stem 30 to prevent leakage around the valve stem. The cylindrical chamber 29 thus formed by the barrel 11 and the end caps 19 and 20 is fluid tight and no fluid can leave this chamber except through one of the ports 15, 16 and 17.

Numeral 35 indicates a flexible valve disc that has a central portion held on the valve stem by two collars 36 and 37 which are rigidly secured to the valve stem 30 and act to clamp the central portion of the valve disc 35 therebetween. The collars 36 and 37 may be rigidly secured to the valve stem in any suitable way such as by pins driven into aligned apertures in the collars and valve stems. The collars 36 and 37 firmly engage the valve disc which is of flexible material, as will be described, and limit the flexing of the valve disc to the outer peripheral portion thereof as shown in the drawing. Preferably, the outer diameter of the collars 36 and 37 is about three-fourths the outer diameter of the disc 35.

Referring to the valve disc 35, this constitutes a very important part of my invention. This valve disc, as will be evident from FIG. 1, has a diameter slightly in excess of the internal diameter of the chamber 29 so that the outer portion of the valve disc 35 is deflected in one direction or the other. The diameter of the valve disc 35 is so selected that the valve disc will "flip" over center as the valve stem is moved between the two valving positions. Thus, in the position shown in FIG. 1, the valve stem 30 has been moved to the left and in so doing, the outer portion of valve disc 35 has moved over center to the position shown so that the outer edge of the valve disc tends to be pointed in the direction of the opening 17. When, however, the valve stem 30 is moved to the right to the position shown in FIG. 3, the outer edge of the valve disc by reason of the friction with the interior wall of chamber 29 is forced over center to the position shown in FIG. 3 in which the outer edge of disc 35 is directed to the left towards the passage 17. It will be noted that, either in the position shown in FIG. 1 or in the position shown in FIG. 3, the incoming fluid through passage 17 tends to press the outer edges of disc 35 against the interior wall of chamber 25 thus effecting a tight seal between the outer edge of the disc 35 and air wall of chamber 29.

In order to enable the valve disc 35 to move "over center" as the valve stem is moved between its two opposite positions, it is very important that the outer diameter of the disc 35 have a proper relation to the inner diameter of the chamber 29. Obviously, if the disc 35 is not made larger than the internal diameter of passage 29, the end of the disc 35 will merely slide along the interior of the passage 29. Furthermore, the fluid will tend to move the disc away from contact with the wall rather than in contact with it. For example, if the plane of disc 35 were perpendicular to the axis of the chamber 29 throughout its extent, it will be obvious that the incoming fluid passing through passage 17 would tend to deflect the outer edge of the valve disc 35 away from contact with the interior wall of chamber 29, instead of pressing it in contact therewith as is the case with the structure shown. Furthermore, it is also obvious that if the diameter of disc 35 was much greater than the internal diameter of passage 29, the valve disc would not "flip" over center but would remain cupped in one direction. In a typical case, I have found that where the internal diameter of the chamber 29 was 2 ⅛ inches, the disc 35 can have a diameter of about 2 3/16 inches. In other words, the diameter of the disc 35 need be only 1/16 of an inch greater than the internal diameter of the passage 29.

It is also imperative that the disc 35 have good sealing engagement with the interior chamber 29 and be capable of not wearing excessively after sustained sliding movement between the edge thereof and the interior wall of chamber 29. I have found that a suitable material for the disc is a fabric reinforced rubber-like compound such as is often used in sheet gasket. In a typical case, I found it desirable to employ a disc having a thickness of approximately 3/32 inch.

Various means can be used for moving the valve stem 30 between its two positions. The valve stem 30 is preferable provided at its opposite ends with two flattened portions 47 and 48 through which apertures extend. These apertures may be employed for connection of the valve stem to any suitable actuating means. In the particular example shown, I have shown a pair of solenoids 49 and 50 connected to the flattened ends or ears 47 and 48, respectively. The solenoid 49 is provided with the usual solenoid core 51 of magnetic material movable into and out of a central passageway through a solenoid winding 52 disposed on a suitable sleeve of non-magnetic material and partially surrounded by a magnetic shell 53. In the usual manner, upon energization of winding 52, solenoid core 51 is drawn to the left to the position shown in FIG. 1. Similarly, solenoid 50 has a core 54 of magnetic material movable into a central passageway of a winding 55 partially surrounded by a magnetic shell 56. Again, if the solenoid winding 55 is energized, the core 54 will be drawn to the right to cause the valve stem 30 to assume the position shown in FIG. 3. Suitable switching means can be provided for selectively energizing either winding 52 or winding 55 depending upon whether it is desired to have the fluid passing through passage 17 go through outlet passage 15 or outlet passage 16.

The valve body 10 is provided with suitable ears 58 which may be employed to fasten the valve to a suitable base, a fragmentary portion of which is shown and designated by the reference character 59. The solenoids 49 and 50 may likewise be secured to the same base 59 by any suitable means, not shown. The switches for controlling the energization of the solenoids may be located at any suitable point convenient to the user of the equipment with which the valve is associated.

FIG. 2, as pointed out in the brief description of the figures, is an elevational view of the improved valve which shows the external view of the valve housing 11 and the valve ports 12, 13 and 14. In this figure, the flow arrows 60, 61 and 62 show the fluid as entering either port 12 or 13 and leaving at port 15, whereas in FIG. 1, it will be noted that the corresponding flow arrows show the fluid as entering the port 17 and leaving either port 15 or 16. While the construction of the present invention is much more desirable where the intermediate opening 17 is the inlet opening, it can still be used with an arrangement in which ports 12 and 13 are inlet openings. In such case, when the valve is in the position shown in FIG. 1, fluid enters through passageway 16 and leaves through passageway 17. When it is in the position shown in FIG. 3, it enters through passageway 15 and leaves through passageway 17. The only drawback to this type of arrangement is that, as is evident from FIGS. 1 and 3, the fluid in passage 17 tends to force the edge of the valve disc 35 away from the interior wall of the chamber 29. This tendency is resisted by the pressure of the fluid entering the passageway 16 and leaving through passageway 17. Thus, while the device of FIG. 2 can be used for admitting the passage of liquid from either openings 15 and 16 to an outlet port 17, it works more satisfactorily where the passage 17 is the inlet passage.

In operation, and referring to the type of arrangement shown in FIGS. 1 and 3 where the intermediate passage 17 is the inlet passage, if it is desired to have fluid pass from passage 17 through passage 16, the solenoid operator 49 is energized to cause the valve stem to assume the position shown in FIG. 1. The lefthand movement of the stem is limited by the pin 21 which engages the shoulder 25 to limit the movement of the valve stem 30 to the left. The movement of the valve stem will have caused the outer edge of the valve disc 35 to be deflected to the right as shown in FIG. 1. The fluid can then pass through passage 17 and out through passage 16. The pressure that is maintained in the chamber 29 will act to press the valve disc 35 more firmly into engagement with the wall of the chamber 29. Thus, despite the edgewise seal provided between the valve disc 35 and the interior chamber 29, the passage of fluid between passage 17 and outlet passage 15 will be effectively blocked and the only fluid flow will be from inlet passage 17 through outlet passage 16. The solenoid 49 need be energized only momentarily or just sufficiently long to cause the valve stem to assume the position in FIG. 1. When it is desired to establish the passage of fluid between inlet passage 17 and outlet passage 15 and to interrupt the passage of fluid between inlet passage 17 and outlet passage 16, the solenoid winding 53 is deenergized, if it has been maintained energized, and winding 55 is energized to cause the solenoid core 54 to move to the right and cause the valve stem to assume the position shown in FIG. 3 in which collar stop pin 22 is now in engagement with shoulder 26. When this happens, the edge of valve disc 35 is "flipped" over center to the position shown in FIG. 3. Again, this is due to the frictional contact between the edge of the valve disc and the interior wall of chamber 29. Under these conditions, fluid flow between passageway 17 and outlet passageway 16 is blocked as shown in FIG. 3 and it is now possible for fluid to flow through passageway 17 and out through passageway 15. Again, the valve disc 35 will be so disposed that the pressure in chamber 29 will be effective to press the outer edge of valve disc 35 more firmly against the interior wall of channel 29.

It will be seen that I have provided a fluid control device which is extremely simple in construction and which will effectively control the passage of fluid between various outlets. While I have shown a specific embodiment for purposes of illustration, it is to be understood that the scope of the invention is limited solely by the appended claims.

I claim:

1. A multiple port fluid control device comprising:
   a housing having a cylindrical chamber therein of uniform cross-sectional area and three ports communicating with said chamber, a first and second of said ports being spaced apart and the third of said ports being disposed between and spaced from said first and second ports,
   a valve stem slidably supported in said housing and having at least one portion extending out of said housing and designed for connection to a valve actuating device, and
   a flexible valve disc having a central portion fixedly secured to said valve stem intermediate the ends thereof in such a position that said valve stem is movable between a first position in which said valve disc is disposed between said first and third ports and a second position in which said valve disc is disposed between said second and third ports, said valve disc having an outer portion having a peripheral configuration of the same shape as the cross-sectional area of said chamber, the area of said valve disc being sufficiently larger than the crosssectional area of said chamber such that as said valve disc is slid along the interior of said chamber in seating engagement therewith, the outer portion thereof is flexed away from a plane transverse to said valve stem in a direction opposite to the direction of movement thereof, said valve disc being sufficiently small that the outer portion thereof is moved from one flexed position to an opposite flexed position as said valve stem is moved back and forth so that the outer portion of the disc is always directed towards said third port.

2. The fluid control device of claim 1 in which said disc is circular and said chamber has a cross-sectional area of smaller diameter than said disc.

3. The fluid control device of claim 1 in which said housing has internal shoulder portions at opposite ends and stop means secured to said valve stem and selectively engageable with said shoulder portions to limit movement of said valve stem between said first and second positions.

4. The fluid control device of claim 1 in which the central portion of said valve disc is held between two rigid collars secured to said valve stem so as to limit the portion of said disc which can flex.

5. The fluid control device of claim 4 in which the disc is circular and said rigid collars are also circular and each have a diameter approximately ¾ the diameter of the disc.

6. The fluid control device of claim 1 in which the disc is formed of a fabric reinforced rubber like product.

7. The fluid control device of claim 1 in which the third port is intended for connection to a source of fluid under pressure so that regardless of whether said valve stem is in said first position or said second position, the pressure of the fluid tends to hold the edge of the disc against the interior wall of the chamber.

8. The fluid control device of claim 1 in which an electrical actuator is provided for moving said valve stem between said first and second positions.

* * * * *